United States Patent [19]

Lazzarini

[11] 3,855,916
[45] Dec. 24, 1974

[54] DRY PEELING APPARATUS
[76] Inventor: Louis P. Lazzarini, 1125 Denise Way, San Jose, Calif. 95125
[22] Filed: Oct. 24, 1972
[21] Appl. No.: 299,760

Related U.S. Application Data

[63] Continuation-in-part of Ser. No. 826,377, May 21, 1969, abandoned, and a continuation-in-part of Ser. No. 42,925, June 3, 1970, abandoned, and a continuation of Ser. No. 148,410, June 1, 1971, abandoned.

[52] U.S. Cl. .................................. 99/623, 99/627
[51] Int. Cl. ............................................. A23n 7/02
[58] Field of Search .......... 99/233.8, 451, 623–624, 99/626–627, 629, 534, 625; 241/166

[56] References Cited
UNITED STATES PATENTS

| | | | |
|---|---|---|---|
| 2,021,970 | 11/1935 | Urschel | 99/624 |
| 2,623,737 | 12/1952 | McEachran | 241/166 X |
| 2,811,995 | 11/1957 | Bremmer | 99/626 |
| 2,841,340 | 7/1958 | Muller | 241/166 X |
| 2,985,210 | 5/1961 | Magnuson | 99/629 X |
| 2,997,085 | 8/1961 | Magnuson | 99/629 x |
| 3,158,187 | 11/1964 | Smith | 99/629 X |
| 3,190,329 | 6/1965 | Bradway | 99/629 X |
| 3,192,974 | 7/1965 | Hickey | 99/627 |
| 3,204,878 | 9/1965 | Peacock | 241/166 X |
| 3,460,162 | 8/1969 | Sijbring | 99/233.8 |
| 3,478,796 | 11/1969 | Rafanelli | 99/495 |
| 3,517,715 | 6/1970 | Graham | 99/233.8 X |
| 3,547,173 | 12/1970 | Graham | 99/233.8 X |

Primary Examiner—Harvey C. Hornsby
Assistant Examiner—Alan Cantor
Attorney, Agent, or Firm—Naylor, Neal & Uilkema

[57] ABSTRACT

The present apparatus relates to the peeling of fruit and vegetables, potatoes, for example, wherein the potatoes are first subjected to lye, then to an infra-red treatment to activate the lye with respect to the peel, defects, and eyes of the potatoes. The treated loosened peel, defects, and eyes are then removed from the potatoes. These potatoes are subsequently washed and treated in a sulfite tank, and are used in frozen mashed potatoes, frozen French-fried potatoes, etc.

6 Claims, 8 Drawing Figures

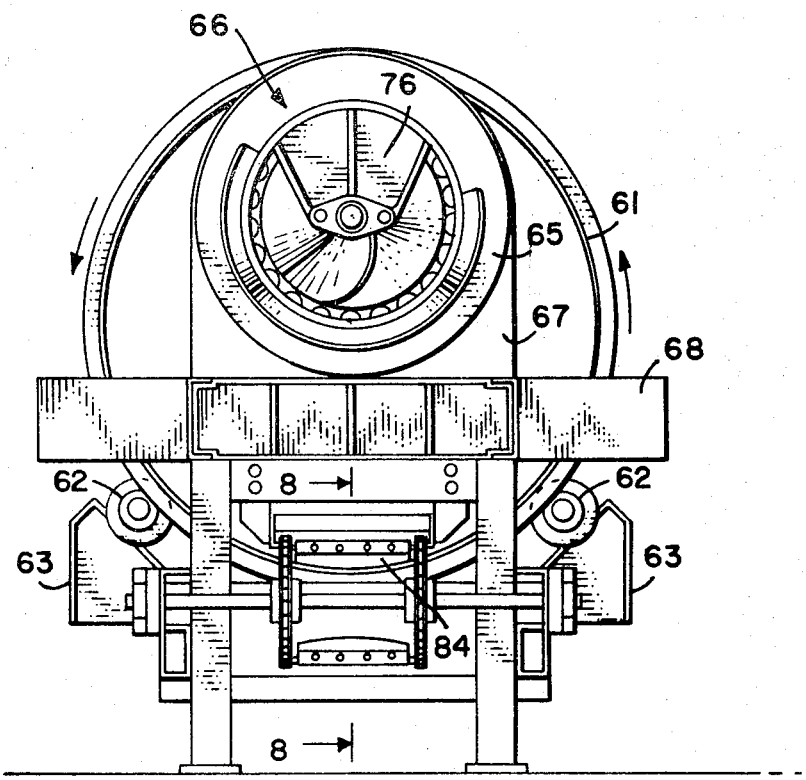
FIG. 2
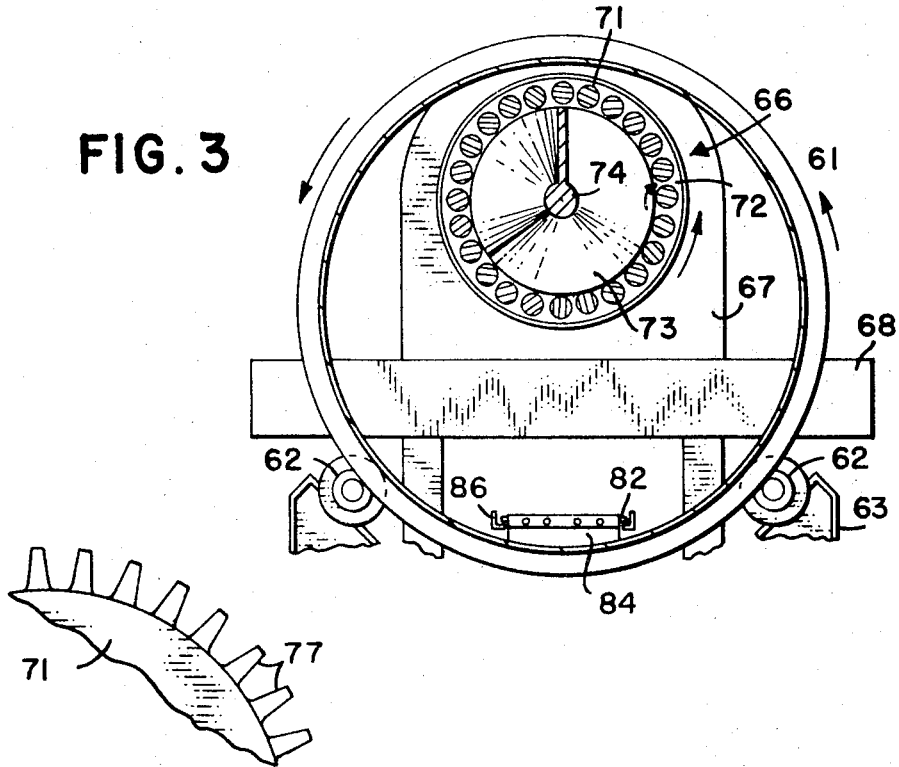
FIG. 3
FIG. 4

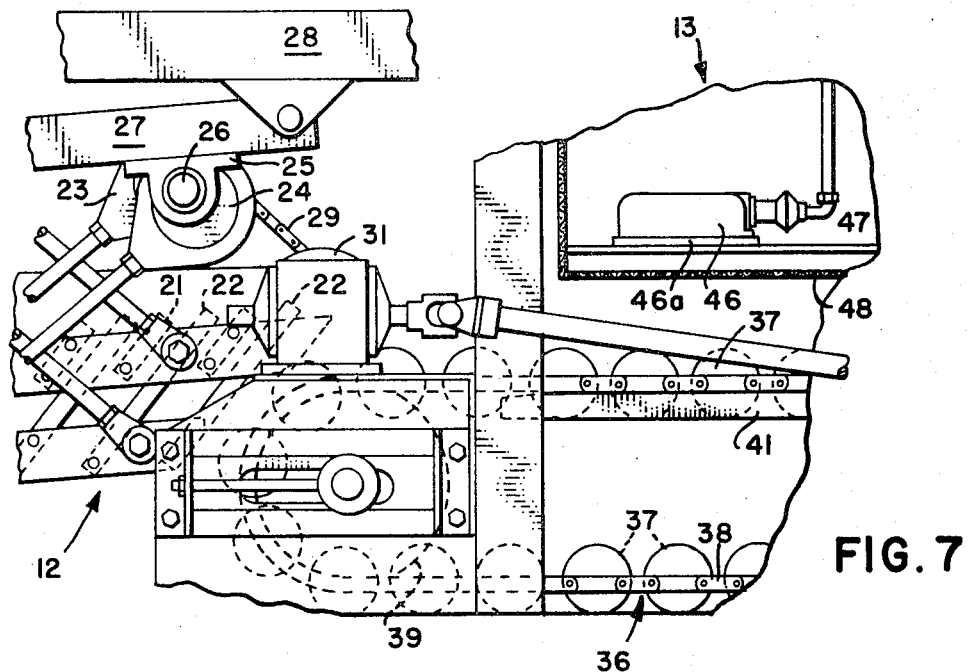
FIG. 7
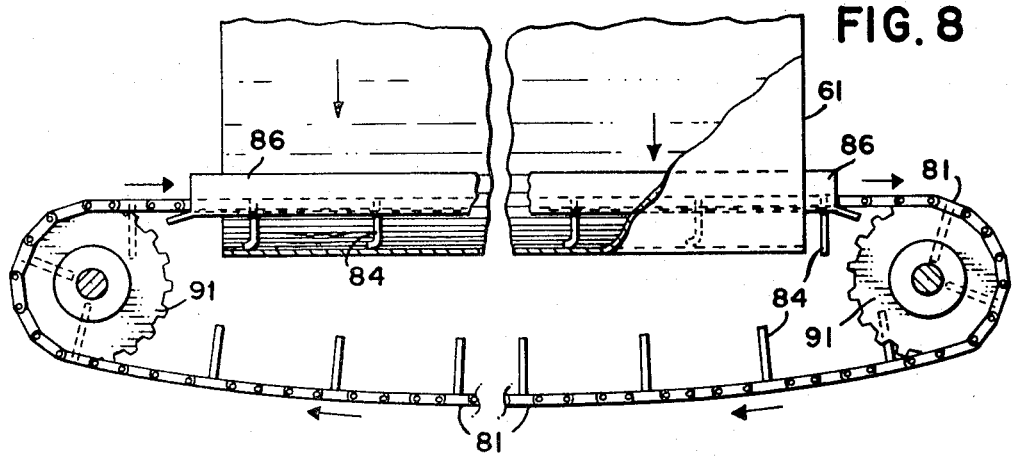
FIG. 8
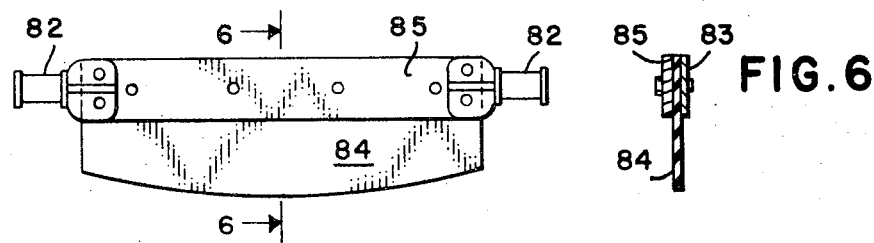
FIG. 5
FIG. 6

DRY PEELING APPARATUS

DESCRIPTION OF THE INVENTION

This application is a continuation-in-part of each of my co-pending applications, Ser. No. 826,377 filed May 21, 1969, Ser. No. 42,925 filed June 3, 1970 and a continuation of my application Ser. No. 148,410 filed June 1, 1971, all abandoned.

The present invention relates to the peeling of fruit and vegetable articles and it relates particularly to the peeling of Irish potatoes, and is concerned with a apparatus wherein substantially the entire surface of the potato will have the peel removed depending upon the age and condition of the potato and so that only a minimum amount of hand trimming will be required.

In general, potatoes in prime condition will be substantially wholly peeled including the eyes and defects, and very little trimming will be required. As the age of the potatoes increases and the season grows later, there are more defects present, i.e., more darkened portion of the skin, and some additional hand trimming will be required.

It is a general object of the invention therefore to provide an improved peeling apparatus for fruit and vegetables such as Irish potatoes.

Another object of the invention is to provide apparatus of the above character wherein the lye solution covering the potatoes is activated by means of infra-red ray treatment so that the entire skin surface portion of the potato including defects and eyes will be conditioned for removal, and subsequently subjected to a scrubbing peeling operation wherein a substantially dry peel is removed.

It is another object of the invention to provide improved apparatus for a dry process for peeling fruit and vegetables such as Irish potatoes.

It is a further object of the invention, therefor, to provide an improved clean-out mechanism for removing the peel and other debris derived from a peeling operation for fruit and vegetables.

A further object of the invention is to provide improved clean-out mechanism of the above character wherein the area of disposal of the scraped out peel and debris is localized so as to be easily handled.

Other objects and advantages of the invention will be apparent from the following description of a preferred embodiment thereof as illustrated in the accompanying drawings in which:

FIG. 2 is a transverse elevational view taken in a plane indicated by the line 2—2 in FIG. 1;

FIG. 3 is a transverse sectional view taken in a plane indicated by the line 3—3 in FIG. 1;

FIG. 4 is an enlarged end elevational view of one of the peeling rolls;

FIGS. 5 is an enlarged view of the scraper blade as seen in FIG. 3;

FIG. 6 is a transverse sectional view through the cleaning and scraping blade shown in FIG. 5 as indicated by the line 6—6 in FIG. 5;

FIG. 7 is a fragmentary enlarged elevational view partially in section of a portion of the machine where the shuffle feed mechanism delivers potatoes to the roller conveyor; and FIG. 8 is a longitudinal sectional view through the clean-out mechanism and the plane of the view is indicated by the line 8—8 in FIG. 2.

Figure 1:
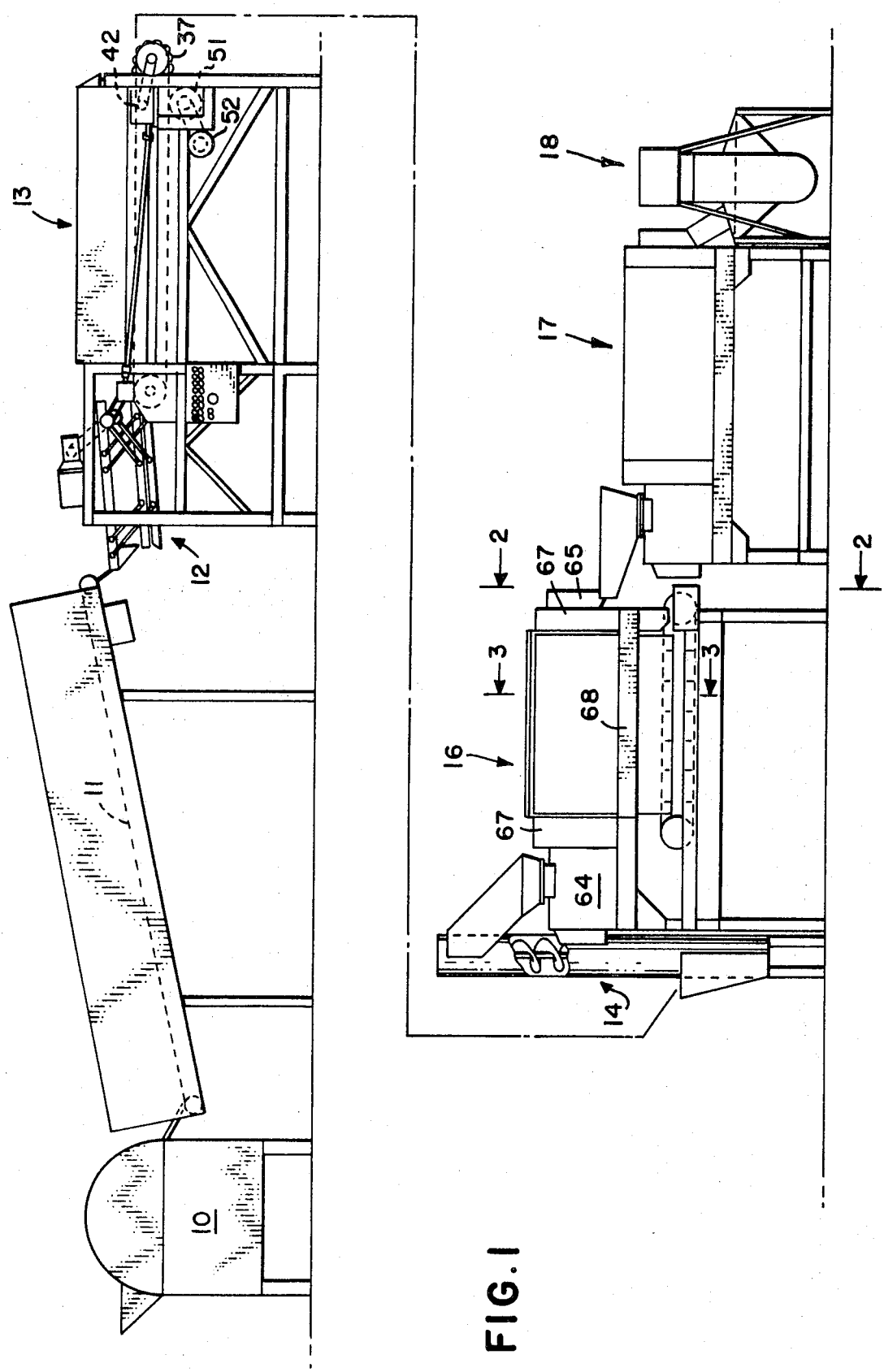
FIG. 1 is a schematic side elevational view of apparatus for carrying out the invention.

Prior work has been done on the development of a dry peeling process for fruit and vegetables. For example, the patent to Willard U.S. Pat. No. 3,370,627 discloses the use of infra-red ray treatment of caustic coated fruit or vegetables to condition them for a peeling operation. Also, the U.S. Department of Agriculture at Western Utilization and Research Development Division, Albany, Calif. has further developed the dry peeling process using the caustic coated potatoes and the infra-red treatment together with a rubber roll peeler. This system is described in the Sept., 1968 issue of Food Processing, and in the Patent to Graham et al. U.S. Pat. No. 3,517,715 dated June 30, 1970. The instant invention has to do with further improvements of apparatus used in the process described in the above two prior publications and, more particularlu, has to do with the provision of a full production line for a dry peeling process capable of handling several tons per hour of potatoes.

Referring to FIG. 1, the apparatus of the instant invention is shown schematically, and it includes a tank 10 containing an appropriate lye solution for coating the potatoes with lye. From the tank 10, the caustic coated potatoes are discharged onto a conventional conveyor belt 11 for a holding step for a given interval of time for the lye treatment. The potatoes are discharged from the conveyor 11 onto a shuffle feed conveyor 12 of a conventional type as illustrated in the patent to Magnuson et al., U.S. Pat. No. 2,792,929. The shuffle feed mechanism arranges the potatoes in rows with their length extending transversley of the direction of flow of the potatoes, and from the shuffle feed mechanism the potatoes are discharged in rows onto a roller conveyor of the infra-red treatment unit 13. The infra-red rays serve to activate the lye on the potatoes and thereby condition the desired surface portions for removal while they are being rotated by the rolls. The potatoes are discharged into an elevating screw 14 for lifting them up for discharge into a scrubber peeler mechanism 16 which serves to remove the loosened peel, eyes and defects of the potatoes. No water is used in the peel removal. After the removal of the desired surface portions, the potatoes are discharged into a washer unit 17 of conventional construction and from the washer unit 17 they are carried through a sulfite tank 18 for treatment to prevent discoloration.

Referring to FIG. 7, the infra-red treating unit 13 is illustrated in further detail. The shuffle feed mechanism 12 is shown as including respective sets of shuffle members 21 and 22 which are driven from respective eccentric mechanisms 23, 24 from a drive shaft 26 journaled in bearings 25 on a frame member 27 carried by an upper frame member 28. The shaft 26 is driven through a chain 29 from a motor and gear mechanism 31.

The discharge end of the shuffle feed, i.e., the last shuffle member 22 (FIG. 7) is disposed over the end of a roller conveyor 36 comprising a series of rolls 37 carried by a pair of conventional conveyor chains 38 and trained about respective sprockets including an adjustable idler sprocket 39. The upper stretches of the chains 38 travel in tracks 41 (only one of which is seen in FIG. 7) which serve to rotate the rolls 37 as they are advanced by means of a drive through a gear box 42

(FIG. 1). These rolls 37 are timed with respect to the shuffle feed 12 to receive rows of potatoes arranged transversely with their length at a right angle to the direction of feed of the shuffle feed and the roller conveyor, so that these potatoes are in position to be rotated by the rolls 37 as they are passing beneath the infra-red heat units 46, one of which is seen in FIG. 7. There is a rectangular array of these units 46 over the treating area of the infra-red treating unit 13. The bottom face 46a (FIG. 7) of the infra-red units 46 is perforated ceramic plate of conventional construction which is supported by suitable supporting strips 47. Spaced below these infra-red units 46 is a wire mesh screen 48 as a safety measure for catching any broken pieces of ceramic. These units 46 are fed a mixture of gas and air which burns below the plate 46a to heat these plates to a preferred temperature for optimum production of infra-red rays of about 1,700° to 1,800° F.

Means is provided for cleaning the rolls 37 of the roller conveyor and this means takes the form of a wire brush roll 51 (FIG. 1) which engages the outer surface of the rolls 37 as they start their return movement after discharging the potatoes into the vertical feed screw 14. The wire brush roll is suitably driven by a belt mechanism 52 to rotate in a clockwise direction as viewed in FIG. 1.

Referring to FIGS. 1, 2, 3 and 8, the scrubber peeler for dry peeling of the conditioned potatoes is illustrated. In general, this comprises a cylindrical housing 61 (FIG. 2) which is supported on trunnions 62, four in number, on yoke members 63 and the cylindrical peel collector housing 61 is rotated at a rather slow rate (about 1 or 2 rpm) by suitable drive means. Extending through the housing 61 is a rotatable peeler scrubber unit 66 including end castings 64 and 65 in which the cylindrical unit 66 is journaled. The end castings 64 and 65 are supported in upright frameworks 67 (FIGS. 1 and 2) connected to a horizontal framework 68. The peeler scrubber unit includes an endless series of peeling and scrubbing rolls 71 which are journaled in respective end rings 72, and have extending through the center thereof a feed screw 73 whose shaft 74 is journaled in bearing brackets 76 at its respective ends. The brackets 76 are overhead brackets and leave the lower portion of the rolls exposed as seen in FIG. 2. Each roll comprises an array of molded fingers 77 (FIG. 4) which are in the form of truncated cones of resilient material such as synthetic rubber. The array of peeling rolls 71 is rotated in a counterclockwise direction (the same direction as the housing 61) as viewed in FIG. 3. The individual peeling rolls 71 are rotated in a clockwise direction as viewed in FIG. 3 and the speed of rotation is preferably in the range of from about 600 to 960 rpm where the peeling rolls themselves are about 3 inches in diameter. As the feed screw 73 carries the potatoes past the peeling rolls 74 the resilient fingers 77 impact the pototoes over their entire surface to give both a peeling and a scrubbing action to remove the skin, any defective portions, and also to remove the eyes of the potatoes. These fingers when impacting the potatoes bend and when released are self-cleaning of any peel of debris collected by virtue of their truncated cone shape and their snapping action is being restored to their radial position.

It will be seen referring to FIG. 2 that the peeler scrubber unit 66 has its axis offset upwardly from the axis of the peel collector housing 61 and is positioned in the upper portion of the space within the housing 61 so that there is a skin and debris trapping area to either side and below the peeler scrubber unit. The rolls 71 are rotated on their own axis in addition to the rotation of the array and the result is a centrifugal action acting on any peel or debris collected by the peeling studs or fingers 77 to cause this debris or skin to be flung from these and to be received on the walls of the housing 61.

A clean-out mechanism is provided as illustrated in FIGS. 2 and 7 and comprises a pair of chains 81 having spaced wings 82 projecting from certain of its limbs to which a transverse plate or bar 83 is bolted. This bar 83 extends between the two chains 81 and has bolted thereto a resilient clean-out blade 84 and a receiving plate 85. Each blade 84 has its outer edge formed at the same curvature at the inner surface of the cylinder 61 to effect an efficient wiping action. The chains 81 are carried in the angle shaped guides 86 and while the upper stretch of the clean-out conveyor is traveling through the drum, the chains 81 are lifted slightly above the guides 86 by the engagement of the flexible clean-out blades 84 with the cylinder 61. The blades 84 bend slightly while traveling through the cylinder and to effect a good cleaning action and also provide a flipping action as they pass over the discharge end of the cylinder 61. This clean-out conveyor 81 is carried on suitable sprockets 91 as seen in FIG. 8 and is driven in a suitable manner with reference to the speed of rotation of the drum 61 to provide an area for cleaning of about one-third of the length of the clean-our blades 84. The remaining length of the blade is used to catch overflow material or to let the pile of material spread during the clean-out action.

After the potatoes are peeled in a dry fashion in the scrubber peeler unit 16, they are carried into a washer unit 17 of conventional construction. From the washer 17, the peeled and washed potatoes are discharged into sulfite tank 18 so as to be maintained free of oxidation during delivery to their point of use.

While I have shown and described a preferred form of the invention, it is capable of variation and modification from the form shown so that its scope should be limited only by the scope of the claims appended hereto.

I claim:

1. In an apparatus for peeling fruit and vegetables having peel removing means for removing the peel and debris, said means comprising a generally horizontal cyliner driven for rotation about its longitudinal axis as defined by a series of longitudinally extending peeling rolls which individually rotate about their respective longitudinal axes and throw peel and debris to the exterior of the cylinder, the improvement which comprises a generally horizontally extending housing disposed around and coextensive with said peel removing means to receive and collect on the interior pieces of peel and debris thrown from the rolls of the peel removing means, said housing being mounted for movement around said peel removing means; means driving said housing for movement around the peel removing means to move peel and debris collected on the interior of the housing to a discharge location; and means at the discharge location for removing the peel and debris from the interior of the housing.

2. In apparatus for peeling fruit and vegetables as recited in claim 1, in which said means for removing peel and debris from the interior of the housing comprises a series of scraper blades, and means for moving said scraper blades axially with respect to said housing while in scraping engagement with the interior thereof.

3. In an apparatus for peeling fruit and vegetables as recited in claim 2, in which the means for moving the scraper blades with respect to the housing comprises an endless conveyor element.

4. In apparatus for peeling fruit and vegetables as recited in claim 2, in which said scraper blades are of resilient character and are yieldably urged into engagement with said housing so as to provide an efficient scraping action during movement along said housing and to provide a flipping action as each scraper moves out of engagement with said housing.

5. In an apparatus for peeling fruits and vegetables as recited in claim 2, the improvement wherein the housing and the scraper blades are driven at such relative speeds that the path of peel particles and debris removed by the blades is of a width less than the width of the path on the housing traversed by the blades.

6. In an apparatus for peeling fruit and vegetables as recited in claim 1, in which the peel removing means is disposed eccentrically within the housing in a position in close proximity to the upper extremity of the housing whereby peel and debris thrown from the upper portion of the peel removing means need traverse a relatively short distance as compared to that thrown from the lower portion of the peel removing means before being received and collected on the interior of the housing.

* * * * *